Patented Nov. 3, 1953

2,658,037

UNITED STATES PATENT OFFICE 2,658,037

MANUFACTURE OF LUBRICATING GREASES

Eduard Orno-Ornfeldt, Bonn-Dransdorf, Germany, assignor to Chemieprodukte G. m. b. H., Leverkusen-Rheindorf, Germany No Drawing. Application September 26, 1950, Serial No. 186,908

2 Claims. (Cl. 252—42)

In my application, Serial Number 179,095, filed on August 12, 1950, a method for the production of a polymerization product was disclosed, in which animal fats or oils were saponified with caustic soda, in such a manner that the product was one of an unsaturated character. In accordance with that invention, the fats and oils were first saponified, then after the addition of mineral oils were boiled to the extent of the removal of water, and thereupon the mass was stirred and stiffened to homogeneity. The stiffened mass could then be further ground, and stirred with benzol or amyl acetate to homogeneity. To this so obtained product, an oil was added, in order to obtain a consistent fat, or a material having a high lubricating capacity, and it was thereby that the purpose of that invention was obtained.

In accordance with the present invention, the product after the addition of the oils, changed into lubricating materials, may now be utilized at temperatures of from minus 50° C., with retention of the lubricating capacity. Beyond this, the dropping point of the product of that invention in its connection with said oils are to be increased up to about 140° C.

The mixture of the invention which is added to oils of insufficient lubricating capacity, should be, in accordance with the invention produced in such a manner that are first, as described in the earlier application, animal fats or oils of all kinds, so, as an example, to saponify also mineral oils with caustic soda, so that these oils show a strongly unsaturated character, whereupon to this intermediate product mineral oil in a quantity at least equal to the quantity of the unsaturated oleaginous material such as animal fats or oils is added and the mixture is cooked for the removal of the water. To this, in accordance with the present invention, waxes are to be added which are melted in the mixture to the solving of the wax without any residue. Thereupon, the new mixture is cooled, ground, and dissolved in a solvent. This product is aged for about 24 hours before it is added to the oils or fats which are to be improved in their lubricating capacity.

In accordance with the present invention, waxes are added to the intermediate product which is of strongly unsaturated character, these waxes being melted in their entirety during the boiling of the aforesaid mixture when the water is removed. Thereupon, the new mixture is cooled, ground, and dissolved in a solvent. The resulting gelatinous product is rested for 24 hours and then added to mineral oils which are to be improved in their lubricating capacity.

As a unique feature of the present invention it is first now possible, by the application of the aforesaid present invention to utilize petroleum as a lubricating material, as such petroleum has the good attribute of being constant to cold, which attribute almost entirely fails in the heretofore known lubricating materials.

When now petroleum is added to the polymerization product in accordance with the foregoing invention it then has in addition to the constant cold attribute, also a high lubricating capacity, which, as already described for this case, at the same time is supplemented by a dropping point of about 130 to 140° C. Such a product may be used at minus 50° C. without impairing its lubricating capacity. It is necessary however, to increase the indicated addition of waxes to double the amount.

The following is an example:

500 gr. of fish oil preferably (whale oil) are saponified with 140 ccm., 37% caustic soda under slow addition of the latter. Then 1000 gr. of spindle oil are added. In place of the spindle oil, paraffin oil may be used. The mixture is heated to 170° C., so long until a test shows that a part of the mixture when placed upon a piece of paper, and cooled thereon, may be drawn off as a film, and on looking through the same exhibits a uniform structure. 100 gr. raw bee's wax are then added and the temperature is held to about 180° C., until this wax is entirely melted. Then the mass is poured upon a stone or wooden plate and allowed to cool thereon. Then, the product is ground, and is dissolved in a 10% tetralin solution, and allowed to rest for 24 hours.

If natural wax is used, thereby the best results are obtained from raw beeswax, of which relatively small quantities only are required. Also, in the selection of artificial waxes, it is necessary to pay attention that the melting point of these waxes be above 100° C. as much as possible. The addition of waxes for the mixture, is in the quantity from about two to four percent by weight, in relation to the weight of the fat.

As a solvent for the ground product in accordance with the invention, tetralin may be used.

Instead of raw beeswax, bleached beeswax, and benzol instead of tetrain, could be used.

I claim:

1. In the manufacture of lubricating greases, the process which comprises saponifying with caustic soda an unsaturated oleaginous material selected from the class consisting of animal fats and oils, adding a mineral oil in a quantity at least equal to the quantity of said unsaturated oleaginous material and about 2 to 4 per cent of beeswax, heating the mixture to a temperature sufficiently high to drive off the water present until the mixture can be filmed upon cooling, cooling the mass, grinding it, dissolving it in a liquid hydrocarbon solvent, aging the solution for about 24 hours and adding, about 2-5%, to a mineral oil which is to be transformed into a grease.

2. In the manufacture of lubricating greases the process which consists in saponifying fish oil with caustic soda, adding a mineral oil in a quantity at least equal to the quantity of said unsaturated oleaginous material and about 2 to 4 per cent of beeswax, heating the mixture to about 170° C. until the mixture can be filmed upon cooling with the film showing homogenity, cooling the mass, grinding it, dissolving it in a solvent selected from the class consisting of tetralin and benzol, aging the resulting gelatinous material for about 24 hours and adding, about 2-5%, to petroleum oil.

EDUARD ORNO-ORNFELDT.

References Cited in the file of this patent

UNITED STATES PATENTS

| Number | Name | Date |
|---|---|---|
| 2,197,263 | Carmichael et al. | Apr. 16, 1940 |
| 2,444,357 | Maguire | June 29, 1940 |
| 2,495,651 | Butcosk | Jan. 24, 1950 |
| 2,534,053 | O'Halloran | Dec. 12, 1950 |